(12) United States Patent
Vick, Jr. et al.

(10) Patent No.: US 8,902,078 B2
(45) Date of Patent: Dec. 2, 2014

(54) SYSTEMS AND METHODS FOR WELL MONITORING

(75) Inventors: James Dan Vick, Jr., Dallas, TX (US); Bruce Edward Scott, Plano, TX (US); Michael Linley Fripp, Carrollton, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 1029 days.

(21) Appl. No.: 12/962,795

(22) Filed: Dec. 8, 2010

(65) Prior Publication Data

US 2012/0146805 A1 Jun. 14, 2012

(51) Int. Cl.
*E21B 47/18* (2012.01)
*G01V 11/00* (2006.01)

(52) U.S. Cl.
CPC .................................. *G01V 11/002* (2013.01)
USPC ........... 340/854.3; 367/83; 367/176; 367/143

(58) Field of Classification Search
CPC ......... G01V 1/001; G01V 1/143; G01V 1/22; G01V 1/40; G01V 1/42; G01V 1/52
USPC ........ 340/853.1, 854.3–854.4, 856.3; 367/83, 367/143, 176
See application file for complete search history.

(56) References Cited

U.S. PATENT DOCUMENTS

| | | | |
|---|---|---|---|
| 3,665,966 A | 5/1972 | Ver Nooy | |
| 3,811,400 A | 5/1974 | Smilg | |
| 3,891,149 A | 6/1975 | Rendemonti | |
| 4,243,098 A | 1/1981 | Meeks et al. | |
| 4,479,204 A | 10/1984 | Silverman | |
| 4,609,042 A | 9/1986 | Broadus et al. | |
| 4,715,019 A | 12/1987 | Medlin et al. | |
| 4,890,687 A | 1/1990 | Medlin et al. | |
| 4,953,137 A | 8/1990 | Medlin | |
| 5,418,335 A | 5/1995 | Winbow | |
| 5,781,116 A | 7/1998 | Hedger et al. | |
| 6,227,293 B1 | 5/2001 | Huffman | |
| 6,450,258 B2 | 9/2002 | Green et al. | |
| 6,648,082 B2 | 11/2003 | Schultz et al. | |
| 7,219,762 B2 | 5/2007 | James et al. | |
| 7,357,021 B2 | 4/2008 | Blacklaw | |
| 7,636,052 B2 | 12/2009 | Coates et al. | |
| 2003/0042018 A1 | 3/2003 | Huh et al. | |
| 2005/0051327 A1 | 3/2005 | Vinegar et al. | |

(Continued)

FOREIGN PATENT DOCUMENTS

| WO | WO 9902819 | 1/1999 |
|---|---|---|
| WO | WO 2009/009412 | 1/2009 |
| WO | WO 2009009437 | 1/2009 |
| WO | 2012078539 | 6/2012 |

OTHER PUBLICATIONS

International Search Report for PCT/US2008/069225, mailed Jan. 1, 2009 (three pages).

(Continued)

*Primary Examiner* — Albert Wong
(74) *Attorney, Agent, or Firm* — Kilpatrick Townsend & Stockton LLP

(57) ABSTRACT

Devices capable of being disposed in a wellbore for outputting acoustical signals for monitoring downhole parameters are described. Receiving devices positioned remote from the devices and can receive the acoustical signals and determine the downhole parameters. The devices can output acoustical signals in response to fluid flow or otherwise.

22 Claims, 5 Drawing Sheets

(56) References Cited

U.S. PATENT DOCUMENTS

2006/0108111 A1  5/2006  Kas'yanov
2009/0101432 A1  4/2009  Hsu
2012/0111104 A1  5/2012  Taverner et al.

OTHER PUBLICATIONS

Mathisen, et al., "Crosswell Seismic Radial Survey Tomograms and the 3-D Interpretation of a Heavy Oil Steamflood," Geophysics, Society of Exploration Geophysicists, Tulsa, OK, US, vol. 60., No. 3, May 1, 1995 (nine pages).

"Pumping Liquid Nitrogen," May 5, 2009 (14 pages).

International Patent Application No. PCT/US2011/063374 , "International Search Report and Written Opinion", mailed Jul. 30, 2012, 12 pages.

Australian Patent Application No. 2011338685, Patent Examination Report No. 1 issued on Apr. 23, 2014, 3 pages.

SYSTEMS AND METHODS FOR WELL MONITORING

TECHNICAL FIELD OF THE INVENTION

The present invention relates generally to monitoring a well in a subterranean formation and, more particularly (although not necessarily exclusively), to devices positioned in the well for providing acoustical signals representing a downhole parameter.

BACKGROUND

It can be useful to monitor a wellbore traversing a subterranean formation for a variety of reasons, including for safety, determining the presence and type of fluid downhole, determining whether one or more components are positioned properly downhole, determining which component should be run downhole, and otherwise determining the state of the wellbore environment. It can be difficult to monitor complicated wellbores, including those that have one or more deviated wellbores or multiple zones, and long wellbores, such as those extending one to three or more miles below sea level.

Various techniques have been used to monitor wellbore environments. One technique is a smart well implementation that includes positioning downhole a cord that has sensors. The sensors are electronic-based (e.g. powered by batteries or power from the cord) sensors that can detect well conditions and transmit signals through the cord to a receiver. The signals can represent information about the well conditions, such as the presence and source of water. The receiver can interpret the signals and output the information.

Some smart well implementations use resonant sensors positioned downhole that respond to electromagnetic energy transmitted from the surface via a transmission line. The resonant sensors respond to the electromagnetic energy and information about the well condition can be derived by processing the response signal.

Other techniques include running a wireline tool downhole to log the well and determine well conditions, such as the presence and type of fluid downhole, or using a wireless telemetry system by running battery-powered devices downhole to perform measurements and wirelessly transmit the signals to the surface. Another technique includes positioning an acoustical signal generating device downhole that transmits an acoustical signal through a medium and the acoustical signal can be received by a device at the surface. The device analyzes the acoustical properties of the signal to determine information about the medium by comparing the properties to known properties of the acoustical signal generated by the generating device downhole.

Although effective, these techniques use electronic-based components that have a limited lifespan in a downhole environment. Furthermore, it can be difficult to implement most of these techniques in complicated or long wellbores and in existing wellbores. Implementing at least the wireline tool, for example, requires shutting off the well to run the wireline tool and log the well.

Therefore, assemblies are desirable that can be used throughout more of the life of a well, that are easily useable in complicated or long wellbores, and/or that are implemented easily in existing wellbores.

SUMMARY

Certain embodiments of the present invention are directed to devices capable of outputting acoustical signals representing downhole parameters in response to fluid flow or otherwise. Examples of devices include bells and whistles capable of outputting a vibration, sound, or other acoustical signal that represents a downhole parameter.

In one aspect, a system is provided for use with a bore in a subterranean formation. The system includes a device that can be disposed in the bore and that can respond to fluid flow by providing an acoustical signal that represents a downhole parameter. The device can output the acoustical signal to a medium for receipt by a receiving device. The receiving device can be positioned remote from the device.

In another aspect, a system is provided for use with a bore in a subterranean formation. The system includes a device and a receiving device. The device can be disposed in the bore and can respond to fluid flow by providing an acoustical signal that represents a downhole parameter. The receiving device can be positioned remote from the device. The receiving device can receive the acoustical signal.

These illustrative aspects and embodiments are mentioned not to limit or define the invention, but to provide examples to aid understanding of the inventive concepts disclosed in this application. Other aspects, advantages, and features of the present invention will become apparent after review of the entire application.

DETAILED DESCRIPTION

Figure 1:
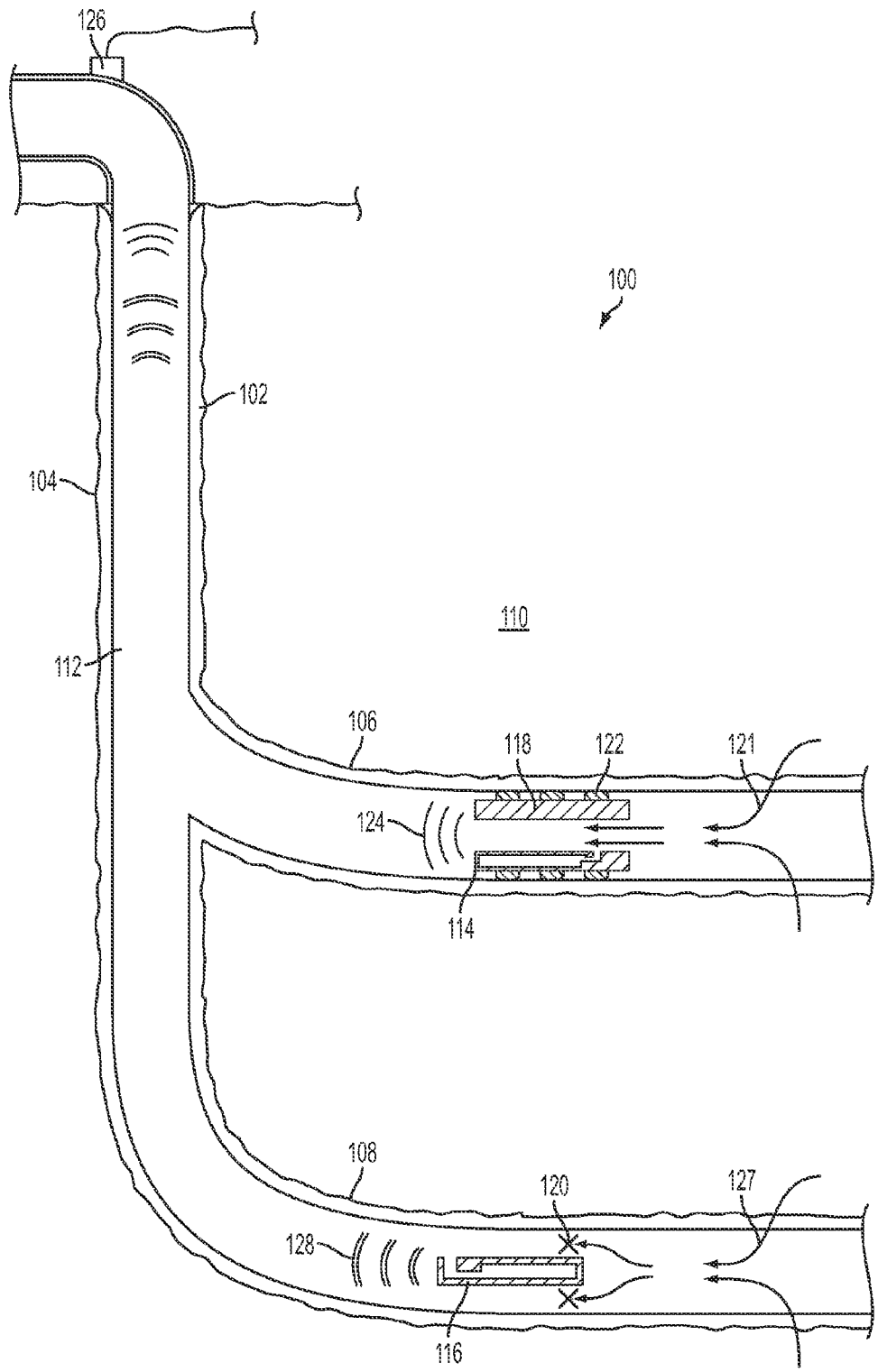
FIG. 1 is a schematic illustration of a well system having acoustical devices according to one embodiment of the present invention.

Certain aspects and embodiments of the present invention relate to devices, such as acoustical devices, that are capable of being disposed in a bore, such as a wellbore, of a subterranean formation for use in producing hydrocarbon fluids from the formation. The devices can be capable of outputting acoustical signals in response to downhole parameters. For example, the devices can output a natural response to a downhole parameter or enhance the downhole parameter, such as by amplifying a change in an acoustical signal in response to the downhole parameter. Receiving devices positioned remote from the devices can receive the acoustical signals and determine the downhole parameters. An "acoustical signal" as used herein includes any sound, pulse, vibration, or other similar energy that is capable of being received by the receiving device.

Downhole parameters can include—but are not limited to—(i) a position of a component, such as a safety valve, choke, or sliding door; (ii) flow rate through a component, such as a choke or sliding door; (iii) temperature, pressure, viscosity, composition, or density of fluid at a location in the wellbore; or (iv) other energy source in the wellbore. The receiving device can use information about the downhole parameters to control components at the surface or downhole, determine whether additional components, such as water control devices, should be run downhole, or otherwise.

In some embodiments, devices are capable of responding to fluid flow at the devices by outputting the acoustical signals. Devices can be configured to output acoustical signals without requiring batteries. Changes in fluid flow, such as changes in fluid temperature, pressure, viscosity, or density, or changes in fluid flow caused by a component changing position, can cause properties of the acoustical signals outputted by the device to change. The acoustical signals can be outputted to a medium, such as fluid media, an oilfield tubular (e.g. casing or tubing), wire, or the subterranean formation. A receiving device can receive the acoustical signals from the medium, determine the change in the acoustical signals and determine the corresponding downhole parameters. In some embodiments, the acoustical signals can be analyzed to determine a downhole parameter that is a status of the medium through which the acoustical signals propagate. For example, a change in signal amplitude or phase may indicate a change in the thickness of a tubular that is the medium. The change in thickness of the tubular may indicate tubular erosion or clogging.

Various types of devices can be used to output the acoustical signals. Examples of such devices include bells, whistles, and other types of resonators or vibrating devices. Bells according to some embodiments can output an acoustical signal with certain properties (such as cadence, signal frequency, and signal amplitude) that change in response to a downhole parameter. Whistles according to some embodiments can output an acoustical signal with certain properties (such a signal frequency and signal amplitude) that change in response to a downhole parameter. For example, fluid flow in a well can cause a device to output an acoustical signal having a tone that depends on the fluid flow. Using relationships applicable to incompressible fluids, downhole parameters can be determined from the tone. Other devices include well components, such as a choke, that output acoustical signals with properties that change based on a configuration of the device. In some embodiments, a bell or whistle is positioned in proximity to a well component, such as a choke, and the bell or whistle can output an acoustical signal in response to fluid flow affected by a position or other configuration of the well component. Devices can be configured to output acoustical signals at various frequencies. An example of a range of frequencies is 2 Hz to 30 kHz.

Systems according to various embodiments of the present invention can include positioning two or more devices downhole, each being capable of outputting acoustical signals. The acoustical signals can be received and analyzed, individually or as a group, to determine downhole conditions. For example, the devices can be configured to output acoustical signals at different frequencies (e.g. one at 500 Hz, another at 1000 Hz, and a third at 2000 Hz). Properties of the acoustical signals outputted by one device can change indicating a downhole parameter at the one device, but not at the location of the other devices. In another example, the acoustical signals outputted by the devices can each change properties in different ways in response to a downhole parameter and, by analyzing the acoustical signals, the downhole parameter can be identified and located. Furthermore, acoustical signals from devices can be characterized against known mediums and flow rates prior to deployment downhole. Acoustical signals can be compared to this characterization to determine downhole parameters represented by the acoustical signals. Acoustical signals from deployed devices can also be compared over time to determine the downhole parameters represented by later received acoustical signals. In some embodiments, a device in one well can output an acoustical signal that can be received by a receiving device positioned in a second well, on the seafloor, or at a platform, such as by using cross-well acoustic tomography or otherwise.

Information about the downhole parameters can be used to determine downhole conditions and output control signals in response to those conditions. For example, the receiving device can be configured such that when an acoustical signal is received having a property (e.g. frequency, amplitude, tone, beat, frequency change, amplitude change, etc.) that crosses a selected threshold, the receiving device outputs a control signal to trigger a blowout preventer, alarm, or other device.

These illustrative examples are given to introduce the reader to the general subject matter discussed here and are not intended to limit the scope of the disclosed concepts. The following sections describe various additional embodiments and examples with reference to the drawings in which like numerals indicate like elements, and directional descriptions are used to describe the illustrative embodiments but, like the illustrative embodiments, should not be used to limit the present invention.

FIG. 1 depicts a well system 100 with acoustical devices according to certain embodiments of the present invention. The well system 100 includes a bore that is a wellbore 102 extending through various earth strata. The wellbore 102 has a substantially vertical section 104 and two substantially horizontal sections 106, 108. The substantially vertical section 104 may include a casing string cemented at an upper portion of the substantially vertical section 104. The substantially horizontal sections 106, 108 are open hole and extend through a hydrocarbon bearing subterranean formation 110.

A tubing string 112 extends from the surface within wellbore 102. The tubing string 112 can provide a conduit for formation fluids to travel from the substantially horizontal sections 106, 108 to the surface. Acoustical devices 114, 116 are positioned with the tubing string 112 in the respective substantially horizontal sections 106, 108. Other components (not shown), such as production tubing, screens, packers, inflow control devices, can be positioned in the wellbore 102.

The acoustical devices 114, 116 depicted in FIG. 1 are coupled with bridge plugs 118, 120. Bridge plug 118 can be run downhole with acoustical device 114. Bridge plug 118 can latch onto a profile 122 in the tubing string 112 to secure the bridge plug 118 and associated acoustical device 114 at a desired position. Fluid flow (as indicated by arrows 121) can be directed through an inner diameter of the bridge plug 118. In response to the fluid flow, the acoustical device 114 can output acoustical signals 124 to the fluid in the wellbore 102, tubing string 112, or other media. The acoustical signals 124 can be received by a receiving device 126 positioned at or near the surface. The receiving device 126 can analyze the acoustical signals 124, such as by determining changes in the acoustical signals 124 over time, to determine a downhole parameter represented by the fluid flow.

Bridge plug 120 can be run downhole with the acoustical device 116. Bridge plug 120 can include one or more locks that can latch into a smooth portion of the wellbore 102 to secure the acoustical device 116 at a desired position. Fluid flow (as indicated by arrows 127) can be directed to an outer diameter of the bridge plug 120 and acoustical device 116. In response to the fluid flow, the acoustical device 116 can output acoustical signals 128 to the fluid in the wellbore 102, tubing string 112, or other media. The receiving device 126 can receive the acoustical signals 128 and analyze them to determine a downhole parameter represented by the fluid flow.

In some embodiments, the receiving device 126 includes a processor and code that is tangibly embodied on a computer-readable medium. The processor can execute the code to cause the receiving device 126 to analyze the acoustical signals and output control signals, a display, alarms, or otherwise, in response to the analysis. In other embodiments, the receiving device 126 is coupled to a processing device that is capable of performing signal analysis of the received acoustical signals. An example of a receiving device 126 is a DynaLink™ acoustic receiver provided by Halliburton of Houston, Tex.

Although FIG. 1 depicts a receiving device 126 positioned at or near the surface, receiving devices according to various embodiments of the present invention can be located at other positions. For example, receiving device 126 can be located in the substantially vertical section 104, in one or more of the substantially horizontal sections 106, 108, at another location on the surface, or in another wellbore (not shown). Similarly, acoustical devices 114, 116 can be positioned at various locations in the wellbore 102, including in the substantially vertical section 104 or both in one of the substantially horizontal sections 106, 108. Acoustical devices according to some embodiments can be positioned in wellbores without using bridge plugs. For example, other coupling devices can be used to position acoustical devices in the wellbore at desired locations or acoustical devices can be coupled with wellbore components that are run downhole to a desired position. Furthermore, acoustical devices and receiving devices according to certain embodiments can be disposed in simpler wellbores, such as wellbores having only a substantially vertical section.

Figure 2:
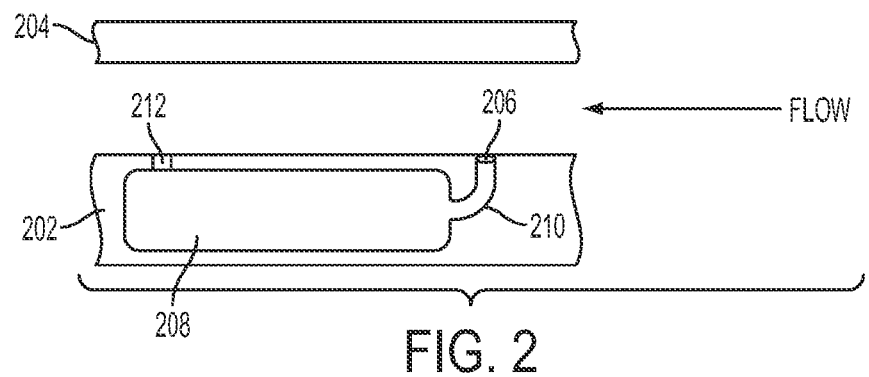
FIG. 2 is a cross-sectional side view of an acoustical device that is a Helmholtz resonator according to one embodiment of the present invention.
Figure 3:
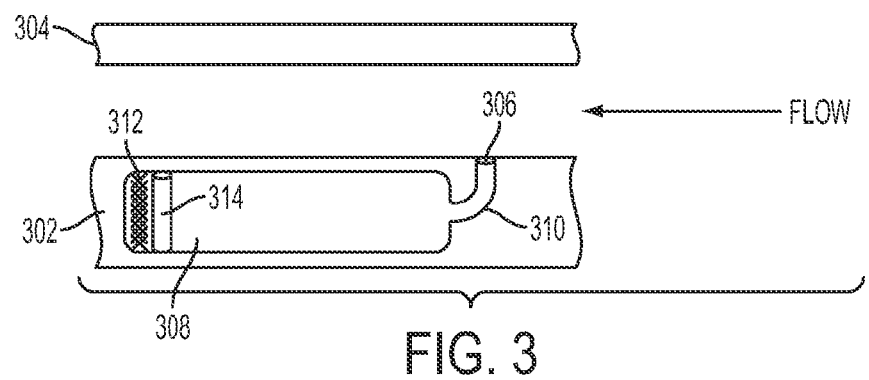
FIG. 3 is a cross-sectional side view of an acoustical device that is a Helmholtz resonator with expandable material according to one embodiment of the present invention.

Various types of acoustical devices can be used. FIGS. 2-7 depict examples of suitable acoustical devices according to certain embodiments of the present invention. FIG. 2 depicts an acoustical device that is a Helmholtz resonator 202 with respect to a portion of a casing or tubing string 204. The Helmholtz resonator 202 is an example of a "whistle-type" acoustical device. It includes a first opening 206 over which fluid can flow. The first opening 206 is in fluid communication with a tank 208 through a tube 210. The Helmholtz resonator 202 may include a second opening 212 to provide for continuous flow through the Helmholtz resonator 202 to flush particulate material and ensure suitable response to fluid flow over the first opening 206.

The Helmholtz resonator 202 can be configured to output acoustical signals at a frequency according to following relationship:

$$f = (c/2\pi) * \sqrt{\frac{A}{V*d}}$$

Where:
c is the speed of fluid flow;
A is the cross-sectional area of the first opening 206;
V is the volume of the tank 208; and
d is the length of the tube 210.

In one example, the speed of fluid flow (c) may be 1500 m/s in water, the cross-sectional area of the first opening 206 (A) may be 2.5 e^-5 m$^2$, the volume of the tank 208 (V) may be 1 e^-5 m$^3$, and the length of the tube (d) may be 0.01 m. The frequency (f) for the example is around 4 kHz, although input impedance of the first opening 206 may change the frequency slightly. The volume of the tank 208, cross-sectional area of the first opening 206, and/or the length of the tube 210 can be modified to change the base frequency at which the Helmholtz resonator 202 resonates. Changes in the speed of fluid flow, such as those caused by changes in temperature, pressure, viscosity, or density of the fluid, can be reflected by a change in the frequency of the acoustical signals. These changes can be detected by a receiving device to determine the downhole parameter.

FIG. 2 depicts another embodiment of an acoustical device that is a Helmholtz resonator 302 with respect to a portion of a casing or tubing string 304. The Helmholtz resonator 302 includes an opening 306 in communication with a tank 308 by a tube 310. An expandable material 312 and sealing member 314 are disposed in the tank 308 at an opposite end to the tube 310. The expandable material 312 can expand as temperature (or other property) increases in the environment at which the Helmholtz resonator 302 is positioned. The expandable material 312 displaces the sealing member 314 toward the tube 310 to reduce the volume of the tank 308. Reducing the volume of the tank 308 can increase the frequency of acoustical signals outputted by the Helmholtz resonator 302. A receiving device can receive the acoustical signals and analyze them to determine, based on a change in frequency, a temperature (or other property) in the environment at which the Helmholtz resonator 302 is located.

An example of the expandable material 312 includes thermally expandable wax. Expandable materials according to various embodiments of the present invention, however, can be any material capable of expanding or contracting in response to an environmental condition, such as temperature, pressure, oil content, pH levels, ion concentration, and flow rate. For example, the expandable material 312 may be an ionic polymer that can expand or contract in response to a pH or ion concentration of the fluid. In some embodiments, a biasing spring can be disposed in the tank 308 to provide reversible operation. In other embodiments, the expandable material 312 can change the shape or cross-sectional area of the inlet to create a change in frequency of an acoustical signal.

Figure 4:
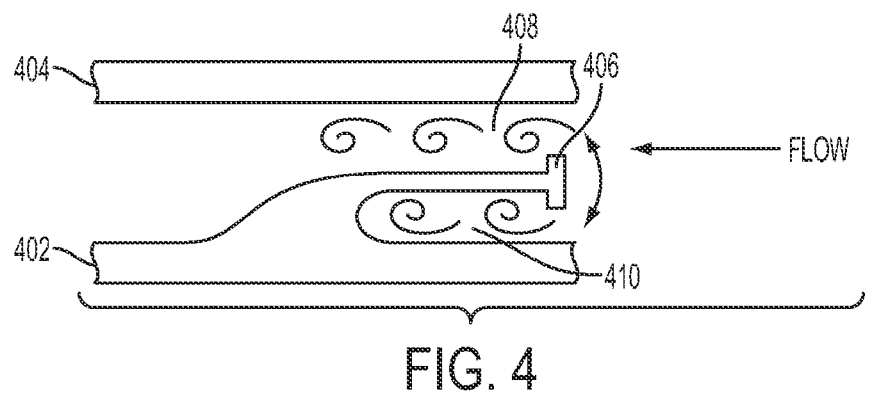
FIG. 4 is a cross-sectional side view of an acoustical device that is a vortex shedding device according to one embodiment of the present invention.

FIG. 4 depicts an acoustical device that is a vortex shedding device 402 with respect to a portion of a casing or tubing string 404. The vortex shedding device 402 is an example of a "whistle-type" acoustical device. The vortex shedding device 402 includes a body 406 that may be a bluff body capable of defining a first path 408 and a second path 410. The body 406 can cause the fluid flow to shed into vortices in an alternating manner, such that the fluid flow sheds into one vortices in the first path 408, a second vortices in the second path 410, a third vortices in the first path 408, and so on. During a "lock-in" period, vortex shedding in this manner causes the vortex shedding device 402 to vibrate and output acoustical signals having a frequency that is dependent on the fluid flow properties.

For example, the frequency can be determined from a Strouhal number that is determined from a Reynolds number. The Reynolds number is a measure of the ratio of inertial forces to viscous forces, quantifying the relative weight of these forces in a fluid flow. For example, in tubing string having a fluid flow rate of 4 m/s, a Reynolds number for a 2 cm wide vortex shedding device may be 1 e^5. The Strouhal number depends on the shape of the vortex shedding device and the Reynolds number. In this example, the Strouhal number may be 0.2. The frequency can be determined using the following relationship:

$$f = \frac{St * v}{w}$$

Where:
St is the Strouhal number;
v is the fluid flow velocity; and
w is the width of the vortex shedding device.

In the example, the frequency (f) is approximately 40 Hz. The frequency may be a base or expected frequency from which downhole parameters can be determined based on acoustic signals outputted by the vortex shedding device that deviates from this frequency.

In some embodiments, the vortex shedding device 402 is coupled to a dynamic mechanical device such that the frequency of the acoustical signals outputted by the vortex shedding device 402 matches the resonant frequency of the dynamic mechanical device. Furthermore, a series of dynamic mechanical devices can be configured to cover a range of possible frequencies of fluid flow. Monitoring the acoustical signals outputted by the vortex shedding device 402 with the known frequencies of the dynamic mechanical devices can allow downhole flow conditions to be determined.

Figure 5A:
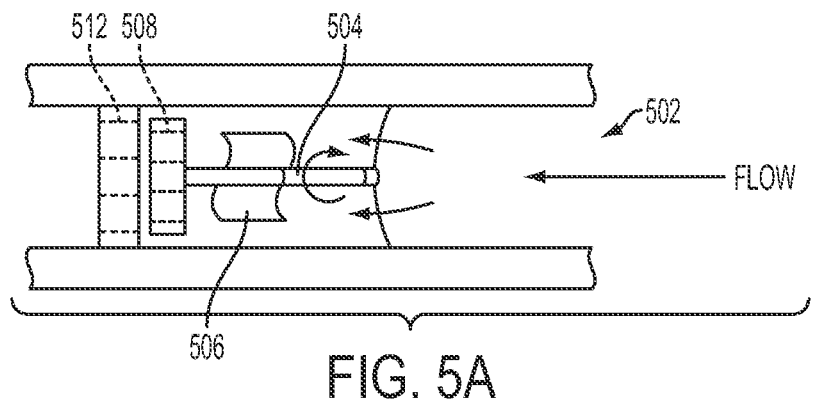
FIG. 5A is a cross-sectional side view of an acoustical device that is a downhole siren according to one embodiment of the present invention.
Figures 5B, 5C:
FIG. 5B is a cross-sectional view of the rotating restrictor of the downhole siren of FIG. 5A according to one embodiment of the present invention.
FIG. 5C is a cross-sectional view of the non-rotating restrictor of the downhole siren of FIG. 5A according to one embodiment of the present invention.

FIG. 5 depicts an acoustical device that is a downhole siren 502. The downhole siren 502 includes a shaft 504 coupled to a blade 506 and a rotating restrictor 508. The downhole siren 502 is a "whistle-type" device. An example of a rotating restrictor 508 is depicted in FIG. 5B. The rotating restrictor 508 includes openings 510A-E through which fluid can flow. The downhole siren 502 also includes a non-rotating restrictor 512. An example of a non-rotating restrictor 512 is depicted in FIG. 5C. The non-rotating restrictor 512 includes openings 514A-E generally having the same or similar shape and size as the openings 510A-E of the rotating restrictor 508.

The downhole siren 502 can receive fluid flow by the blade 506, which causes the shaft 504 to rotate the rotating restrictor 508. In a low friction downhole siren 502, the rotation rate of the rotating restrictor 508 can be proportional to the velocity of fluid flow. Through rotation of the rotating restrictor 508, openings 510A-E alternate between aligning with openings 514A-E to allow fluid flow and aligning with solid surfaces of the non-rotating restrictor 512 to block fluid flow. Alternating allowing fluid flow and blocking fluid flow can cause acoustical signals to be outputted having a frequency that is proportional to the rate of rotation, and thus fluid flow rate. A receiving device can receive the acoustical signals and determine a downhole parameter based on the frequency.

Figure 6A:
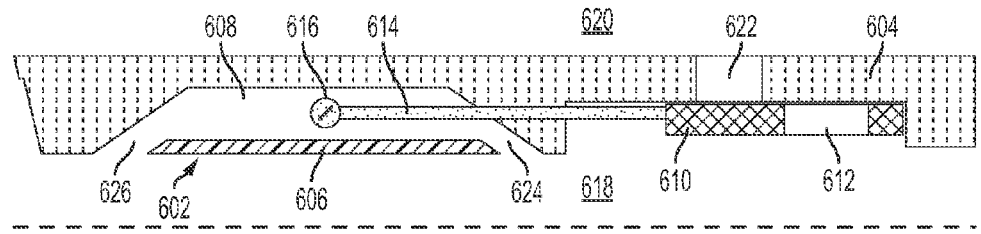
FIG. 6A is a schematic side view illustration of an acoustical device that is a bell coupled with a sleeve in a closed position according to one embodiment of the present invention.
Figure 6B:
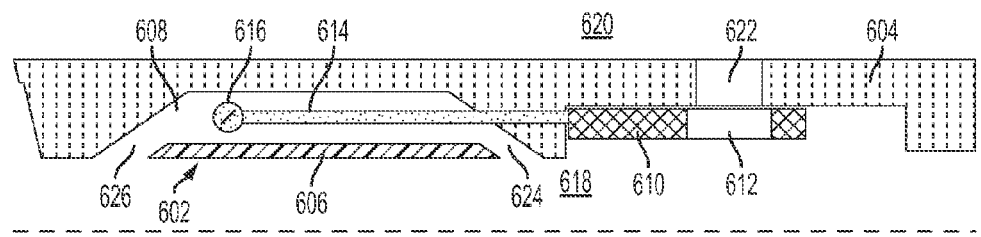
FIG. 6B is a schematic side view illustration of the bell in FIG. 6A with the sleeve in the open position according to one embodiment of the present invention.

FIGS. 6A-B depict a cross-sectional partial view of an acoustical device that is a bell device 602 with respect to production tubing 604. The bell device 602 includes a bell 606, a bell chamber 608, a sleeve 610 having an opening 612, and a clapper 614 having a pivoted wobble plate 616. In some embodiments, the clapper 614 is a flexible clapper. The production tubing 604 can separate an inner diameter 618 of the production tubing 604 with an annulus area 620 between the production tubing 604 and casing string (not shown). The production tubing 604 includes a port 622 through which fluid can flow from the annulus area 620.

The sleeve 610 can control fluid flow through the port 622. The sleeve 610 can be (i) in a closed position, as shown in FIG. 6A, to block fluid flow; (ii) in an open position, as shown in FIG. 6B, to allow full fluid flow; or (iii) an intermediate position that allows less than full fluid flow. A mechanism (not shown) can change the position of the sleeve 610.

The bell 606 can be vibrationally isolated from the production tubing 604. When the sleeve 610 is in the open position as in FIG. 6B (or in an intermediate position) fluid can flow into the bell chamber 608 at a "port-side" or downhole side 624 of the bell chamber 608 and exit at an uphole side 626 of the bell chamber 608. Fluid flowing past the pivoted wobble plate 616 causes the clapper 614 to strike the bell 606 and/or the production tubing 604 to produce acoustical signals. When the clapper 614 is short, the cadence is fast and when the clapper 614 is long, the cadence is slow.

Acoustical signals produced by the bell device 602 can include various properties capable of conveying information about one or more downhole parameters. The properties can include cadence, intensity of bell strike, intensity of production tubing strike, and pulse caused by changing flow rates from interrupted flow through the bell chamber 608. A receiving device can determine the information by analyzing one property or by comparing various properties.

For example, the receiving device can determine that the sleeve 610 is partially open by analyzing the beats per minute of an acoustical signal. The receiving device can compare the intensity of the bell strike to the intensity of the production tubing strike to determine density of the fluid dampening the bell 606. The receiving device can compare the time offset between the bell strike and the production tubing strike to determine fluid density as reflected by the speed of sound travelling through the production tubing 604 and the fluid. The receiving device can analyze cadence to determine fluid pressure and can analyze pulse decay in the acoustical signal to determine additional information. The receiving device can determine flow contribution from fluid flowing from below the bell device 602 (as opposed to through the port 622) by comparing cadence with the sleeve 610 open to cadence with the sleeve 610 closed. The receiving device can determine downhole parameters based on the acoustical signal being a "dirty" signal as compared to a clear signal. A "dirty" signal may indicate a multi-phase fluid medium. For example, a clean signal may indicate a 100% fluid medium and the amount of noise in the signal may increase based on an increased percentage of gas in the fluid medium.

In some embodiments, the receiving device can analyze the various properties of one or more acoustical signals to confirm information obtained by analyzing one property or the receiving device can average the various properties to determine information about a downhole parameter. Bell devices according to some embodiments can include more than one clapper with differing lengths or differently configured wobble plates. These different clappers can output acoustical signals having additional properties that can be analyzed or compared to determine downhole parameters. For example, a bell can include a fixed pivot point and a clapper having a fixed length in addition to a clapper capable of changing position.

Figure 7:
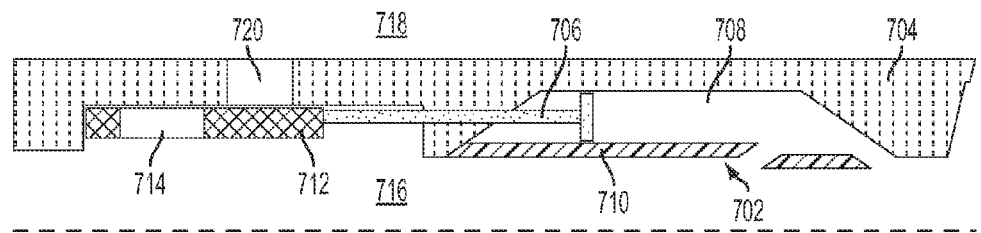
FIG. 7 is a schematic side view illustration of an acoustical device that is a slide according to one embodiment of the present invention.

FIG. 7 is a cross-sectional partial view of an acoustical device that is a slide device 702 with respect to production tubing 704. The slide device 702 includes a slide 706, a chamber 708, and a plate 710. The slide 706 is coupled to a sleeve 712 that includes an opening 714. The production tubing 704 can separate an inner diameter 716 of the production tubing 704 with an annulus area 718 between the production tubing 704 and casing string (not shown). The production tubing 704 includes a port 720 through which fluid can flow from the annulus area 718.

The slide 706 can change position based on the position of the sleeve 712 to change the volume of the chamber 708. The volume of the chamber 708 can affect the tone or frequency of acoustical signals outputted by the slide device. A receiving device can analyze the acoustical signals to determine whether the sleeve 712 is in an open position, a closed position, or in an intermediate position. For example, tone (including tone quality) and intensity of the acoustical signals can provide information about the position of the sleeve 712.

Other types of devices include "flute-type" whistles. A "flute-type" whistle can have openings that can be selectively covered or uncovered according to a downhole parameter. The "flute-type" whistle can output acoustical signals having a tone that depends on the particular openings that are covered or uncovered according to the downhole parameter.

Figure 8:
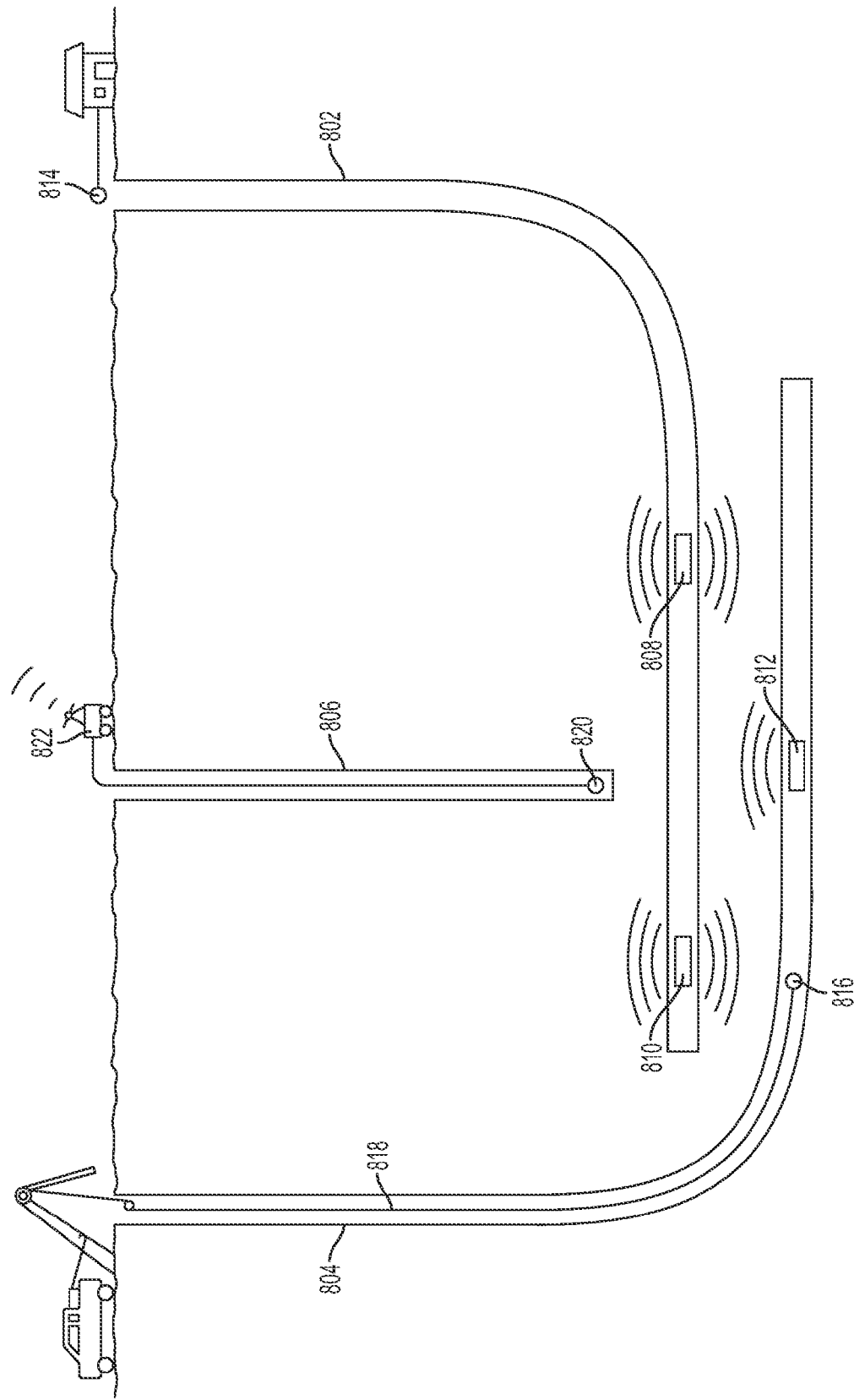
FIG. 8 is a schematic illustration of acoustical devices disposed in multiple wellbores according to one embodiment of the present invention.

Devices according to various embodiments can be deployed in multi-wellbore installations. FIG. 8 depicts three wellbores 802, 804, 806 proximate to each other. Wellbore 802 includes two devices 808, 810 disposed in the wellbore 802. Wellbore 804 includes one device 812 disposed in the wellbore 804. Each of the devices 808, 810, 812 can be capable of outputting acoustical signals representing a downhole parameter, for example in response to fluid flow at the respective devices 808, 810, 812. The acoustical signals from one or more of the devices 808, 810, 812 can be received by (i) a receiving device 814 at or near the surface of wellbore 802, (ii) a receiving device 816 disposed in wellbore 804 and in communication via wireline 818 with the surface, and/or (iii) a receiving device 820 disposed in wellbore 806 and in communication with telecommunications equipment, such as satellite transmitter 822 at the surface of wellbore 806. The satellite transmitter 822 can communicate the acoustical signals or a representation of the acoustical signals to a remote monitoring center. Accordingly, one of the receiving devices 816, 818, 820 can be capable of receiving acoustical signals from devices 808, 810, 812 in more than one wellbore.

In some embodiments, the fluid properties in wellbores can be monitored using cross-well acoustic tomography. Cross-well acoustic tomography can use an electrically generated acoustical signal to evaluate the formation, such as by analyzing the amplitude degradation between two wellbores. A holographic image (e.g. three-dimensional) of the formation properties can be generated by using multiple devices outputting acoustical signals, each tuned to a different frequency.

The foregoing description of the embodiments, including illustrated embodiments, of the invention has been presented only for the purpose of illustration and description and is not intended to be exhaustive or to limit the invention to the precise forms disclosed. Numerous modifications, adaptations, and uses thereof will be apparent to those skilled in the art without departing from the scope of this invention.

What is claimed is:

1. A system for use with a bore in a subterranean formation, the system comprising:
   a device capable of being disposed in the bore and of responding to fluid flow by providing an acoustical signal representing a downhole parameter, wherein the device comprises:
      a first device capable of outputting a first acoustical signal at a first frequency; and
      a second device capable of outputting a second acoustical signal at a second frequency,
   wherein the downhole parameter is determinable by comparing the first acoustical signal to the second acoustical signal,
   wherein the first device and the second device are capable of outputting the first acoustical signal and the second acoustical signal to a medium for receipt by a receiving device, the receiving device being positioned remote from the first device and the second device.

2. The system of claim 1, wherein at least one property of the acoustical signal is representative of the downhole parameter, the at least one property comprises at least one of:
   a tone;
   a beat;
   signal noise;
   a frequency change; or
   an amplitude change.

3. The system of claim 1, wherein the first acoustical signal or the second acoustical signal comprises at least one property representing the downhole parameter, the at least one property comprising a presence of an amplitude signal.

4. The system of claim 1, wherein the first device or the second device comprises a bell having a clapper capable of cooperating with at least one of a plate or a tubing string in response to fluid flow to provide the acoustical signal representing the downhole parameter.

5. The system of claim 1, wherein the first device or the second device comprises a whistle capable of providing the acoustical signal representing the downhole parameter in response to fluid flow.

6. The system of claim 5, wherein the whistle comprises at least one of:
   a Helmholtz resonator;
   a vortex shedding device;
   a downhole siren; or
   a slide device.

7. The system of claim 1, wherein the medium comprises at least one of:
   fluid media;
   an oilfield tubular; or
   the subterranean formation.

8. The system of claim 1, wherein the downhole parameter comprises at least one of:
   a position of a safety valve disposed in the bore;
   a position of a choke disposed in the bore;
   a position of a sliding slide door disposed in the bore;
   flow rate through the choke; or
   flow rate through a sliding side door.

9. The system of claim 1, wherein the downhole parameter comprises at least one of:
   temperature of the fluid at the first device or the second device;
   pressure of the fluid at the first device or the second device;
   multi-phase of the fluid at the first device or the second device;
   a status of the medium;
   viscosity of fluid at the first device or the second device; or
   density of fluid at the first device or the second device.

10. The system of claim 1, further comprising the receiving device, wherein the receiving device is capable of being positioned at least one of:
    in the bore;
    at a surface of the bore; or
    in a second wellbore.

11. The system of claim 10, wherein the receiving device is capable of:
    in response to determining at least one property of the first acoustical signal or the second acoustical signal crosses a threshold, outputting at least one of:
       a control signal to a well component; or
       an alarm.

12. A system for use with a bore in a subterranean formation, the system comprising:
- a device capable of being disposed in the bore and of responding to fluid flow by providing an acoustical signal representing a downhole parameter, wherein the device comprises:
  - a first device capable of outputting a first acoustical signal at a first frequency; and
  - a second device capable of outputting a second acoustical signal at a second frequency,
- wherein the receiving device is capable of analyzing the first acoustical signal and the second acoustical signal to determine the downhole parameter; and
- a receiving device capable of being positioned remote from the first device and the second device, the receiving device being capable of receiving the first acoustical signal and the second acoustical signal.

13. The system of claim 12, wherein the first acoustical signal or the second acoustical signal comprises at least one property representing the downhole parameter, the at least one property comprises at least one of:
- a tone;
- a beat;
- a frequency change;
- signal noise;
- an amplitude change; or
- a presence of an amplitude signal.

14. The system of claim 12, wherein the first device or the second device comprises a bell having a clapper capable of cooperating with at least one of a plate or a tubing string in response to fluid flow to provide the acoustical signal representing the downhole parameter.

15. The system of claim 12, wherein the first device or the second device comprises a whistle capable of providing the acoustical signal representing the downhole parameter in response to fluid flow.

16. The system of claim 15, wherein the whistle comprises at least one of:
- a Helmholtz resonator;
- a vortex shedding device;
- a downhole siren; or
- a slide device.

17. The system of claim 15, wherein the whistle comprises a Helmholtz resonator comprising a tank having an expandable material disposed therein, the expandable material being capable of expanding in response to the downhole parameter to change at least one property of the acoustical signal provided by the Helmholtz resonator.

18. The system of claim 17, wherein the expandable material comprises a biasing spring configured for providing reversible operation.

19. The system of claim 12, wherein the first device or the second device provides the acoustical signal to a medium, the medium comprising at least one of:
- fluid media;
- an oilfield tubular; or
- the subterranean formation.

20. The system of claim 12, wherein the downhole parameter comprises at least one of:
- a position of a safety valve disposed in the bore;
- a position of a choke disposed in the bore;
- a position of a sliding slide door disposed in the bore;
- flow rate through the choke;
- flow rate through a sliding side door;
- temperature of the fluid at the first device or the second device;
- pressure of the fluid at the first device or the second device;
- a status of a medium through which the acoustical signal is configured to propagate;
- multi-phase of the fluid at the first device or the second device;
- viscosity of fluid at the first device or the second device; or
- density of fluid at the first device or the second device.

21. The system of claim 12, wherein the receiving device is capable of being positioned at least one of:
- in the bore;
- at a surface of the bore; or
- in a second wellbore.

22. The system of claim 12, wherein the receiving device is capable of:
- in response to determining at least one property of the acoustical signal crosses a threshold, outputting at least one of:
  - a control signal to a well component; or
  - an alarm.

* * * * *